United States Patent [19]

Ringe

[11] Patent Number: 5,024,996

[45] Date of Patent: Jun. 18, 1991

[54] R-T-E CEREAL WITH SOLUBLE FIBERS

[75] Inventor: Mitchell L. Ringe, Maple Grove, Minn.

[73] Assignee: General Mills, Inc., Minneapolis, Minn.

[21] Appl. No.: 446,247

[22] Filed: Dec. 5, 1989

[51] Int. Cl.$^5$ .......................... A23L 1/42; A23L 1/29; A21D 8/00; A21D 13/00

[52] U.S. Cl. ....................................... 514/54; 424/439; 424/441; 426/2; 426/3; 426/560; 426/620; 426/621; 426/800; 426/804; 426/808; 514/57

[58] Field of Search ....................... 426/2, 3, 800, 804, 426/808, 560, 620, 621; 514/54, 57; 424/439, 441

[56] References Cited

U.S. PATENT DOCUMENTS

| | | | |
|---|---|---|---|
| 3,148,114 | 9/1964 | Fahrenbach et al. | 424/195.1 |
| 3,708,306 | 1/1973 | Appleman | 426/630 |
| 3,732,109 | 5/1973 | Poat et al. | 426/620 |
| 3,876,811 | 4/1975 | Bonner et al. | 426/621 |
| 4,321,263 | 3/1982 | Powell | 424/195.1 |
| 4,348,379 | 9/1982 | Kowalsky | 424/442 |
| 4,459,280 | 7/1984 | Colliopoulos et al. | 424/493 |
| 4,496,606 | 1/1985 | Michnowsky | 426/573 |
| 4,568,557 | 2/1986 | Becker et al. | 426/618 |
| 4,619,831 | 10/1986 | Sharma | 426/93 |
| 4,698,232 | 10/1987 | Sheu et al. | 426/572 |
| 4,759,942 | 7/1988 | Von Fulger | 426/621 |
| 4,766,004 | 8/1988 | Moskowitz | 426/658 |
| 4,777,045 | 10/1988 | Vanderveer et al. | 424/195.1 |
| 4,784,861 | 11/1988 | Gori | 426/74 |
| 4,789,664 | 12/1988 | Seligson et al. | 514/23 |
| 4,824,672 | 4/1989 | Day et al. | 424/195.1 |
| 4,849,222 | 7/1989 | Broaddus | 424/195.1 |
| 4,861,614 | 8/1989 | Seaborne | 426/621 |
| 4,877,627 | 10/1989 | Leitz et al. | 426/804 |
| 4,915,960 | 4/1990 | Holmgren | 426/804 |
| 4,950,140 | 8/1990 | Pflaumer et al. | 426/804 |
| 4,961,937 | 10/1990 | Rudel | 426/552 |

FOREIGN PATENT DOCUMENTS

| | | |
|---|---|---|
| 1221575 | 5/1987 | Canada . |
| 0068229 | 1/1983 | European Pat. Off. . |
| 0166825 | 9/1988 | European Pat. Off. . |
| 0306469 | 3/1989 | European Pat. Off. . |
| 0309029 | 3/1989 | European Pat. Off. . |
| WO88/08257 | 11/1988 | PCT Int'l Appl. . |
| WO89/02225 | 3/1989 | PCT Int'l Appl. . |
| 2201875 | 9/1988 | United Kingdom . |

OTHER PUBLICATIONS

Industrial Gums—Polysaccharides and Their Derivatives, Quince, Psyllium, Flax Seed, and Okra Gums, II. Psyllium Seed Gum, 345-54 (R. Whistler, 2d ed., 1973).
R. W. Schery, Plants for Man, 319 (Prentice Hall Inc., 2d ed., 1973).
T. Tanaka, Tanaka's Cyclopedia of Edible Plants of the World, 563-64, (Keigaku Publishing Co. 1976).
The United States Pharmacopeia, 20th ref., The National Formulary, 15th ed., 915,929 (United States Pharmacopeia Convention, Inc., 1980).
P. Judd, Comparison of the Effects of High- and Low-Methoxyl Pectics on Blood and Faecal Lipids in Man, 48 British Journal of Nutrition, 451-58 (1982).
E. Lund, Cholesteral Binding Capacity of Fiber from Tropical Fruits and Vegetables, 19 LIPIDS 85-90 (1984).
J. Thomas, Alteration of Regression of Cholesterol Accumulation in Rats by Dietary Pectin, 51 British Journal of Nutrition, 339-345 (1984).
C. Morris, A Closer Look at Dietary Fiber, Food Engineering, 132-140, (May, 1985).
J. K. C. Chan et al, A Forgotten Natural Dietary Fiber: Psyllium Mucilloid, vol. 33, No. 11, Cereal Foods World 919-922 (1988).
L. Prosky, Determination of Insoluble, Soluble and Total Dietary Fiber in Foods and Food Products: Interlaboratory Study, 71 J. Assoc. Off. Anal. Chem. 1017-1023 (1988).
Meer Corporation, Technical Information, Psyllium Husks, undated.

*Primary Examiner*—Ronald W. Griffin
*Attorney, Agent, or Firm*—John A. O'Toole

[57] ABSTRACT

Disclosed are ready-to-eat cereals containing high levels of soluble fiber and methods for their preparation. In addition, the cereals contain about 10% to 15% total soluble fiber and about 5% to 15% insoluble fiber. The weight ratio of soluble to insoluble fiber ranges from about 1 to 5:1. The minimum soluble fiber content is 2.8 g/oz. The cereals can be prepared from conventional cereal materials.

29 Claims, No Drawings

R-T-E CEREAL WITH SOLUBLE FIBERS

CROSS-REFERENCE TO RELATED APPLICATION

A commonly assigned co-pending application titled "R-T-E CEREAL WITH PSYLLIUM," Ser. No. 330,245, filed in the name of Ringe et al. on Mar. 29, 1989, contains subject matter related to this application and which subject matter is incorporated herein by reference.

BACKGROUND

1. Field of the Invention

The present invention relates to food products and to their methods of preparation. More particularly, the present invention relates to high fiber, ready-to-eat ("R-T-E") cereal products and to their methods of preparation.

2. Background of the Invention

R-T-E cereals are popular packaged goods food items. R-T-E cereals exist in large numbers of varieties. R-T-E cereals, especially whole grain, are known as good sources of fiber. A good description of the literature pertaining to the health discussion on the role of fiber is found in U.S. Pat. No. 4,777,045 (issued Oct. 11, 1988 to Vanderveer el al. and is entitled High Bran Snack) which is incorporated herein by reference. In view of the health interest in fiber, high fiber cereals are increasingly popular. These cereals contain added levels of fiber sources, especially corn and wheat bran, and range generally from about 2–5 g fiber/oz cereal. Generally, the fiber is predominantly of the insoluble type. Some cereals are formulated from all bran sources and can contain up to 8–10 g/oz fiber. High fiber cereals using purified insoluble fiber sources and artificial sweeteners can even contain as high as 8–13 g fiber/oz of cereal.

While popular, high fiber cereals are not without disadvantages. The primary concern is with the organoleptic qualities of the R-T-E cereal. Generally, as the concentration of fiber increases, the starchy components decrease, adversely affecting the cereals organoleptic and physical properties. High fiber cereals are often dry, exhibit short bowl lives and yield highly frangible food pieces. Second, while most fiber rich R-T-E cereals have higher levels of insoluble fibers, present consumer interest is focused upon cereals containing oat bran which is a rich source of soluble fiber. Of the soluble fiber content in oat bran, about 50% to 90% is beta glucan. Such high fiber cereals are actually quite low in soluble fiber content.

There is a growing awareness of the health benefits to people associated with soluble fiber consumption, especially reductions in blood serum cholesterol, i.e., antihypercholesterolemic benefits. Unfortunately, R-T-E cereals high in soluble fibers typically not only are extremely difficult to manufacture but also exhibit many undesirable attributes. High soluble fiber R-T-E cereals, especially high beta glucan cereals, are difficult to manufacture because they absorb undesirably high amounts of moisture during processing. Also, the cereal dough tends to develop very high viscosities. High soluble fiber R-T-E cereals are often gummy or slimy upon consumption with milk, especially when the soluble fiber is derived from oat bran. The slimy texture of the R-T-E cereal results from the highly viscous nature of beta glucan and hydration of the beta glucan at the surface of the cereal when exposed to liquid.

The present invention is directed towards the provision of a high fiber R-T-E cereal with superior organoleptic attributes or qualities. Surprisingly, the present invention provides such a superior quality high fiber R-T-E cereal which nonetheless contains a high concentration of soluble fiber. Moreover, in preferred embodiments, the present cereal compositions provide high fiber cereals having soluble fiber predominating. The present invention resides in part in the particular selection of barley beta glucan as a soluble fiber source used alone or in combination with oat soluble fiber.

Other high fiber food products containing various fiber sources are well known. For example, U.S. Pat. No. 4,568,557, to Becker et al., discloses a snack food product prepared by pre-mixing a dietary fiber with a food grade oil; premixing a compound coating containing a fractionated fat, sweetener, milk solids, yogurt, and a flavoring agent; blending the two pre-mixtures and adding a cereal product to obtain texture and a dried fruit or nut for flavor; and extruding the resulting mixture into a desired shape.

European patent application No. 0068229, to Kleinert, discloses the addition of the seed coats (episperm) of cocoa beans in finely powdered form, to dough, bread, snacks, and chocolate to increase bulk and stimulate the intestinal tract.

U.S. Pat. No. 4,348,379, to Kowalsky, discloses a dietetic composition for natural digestion regulation containing whole fleawort seeds, whole linseed, wheat bran, lactose, a binding agent based on natural rubber, flavor and food color additives. The preferred binding agent is gum arabic.

While these references disclose compositions of improved palatability, the taste of most products, especially R-T-E cereals containing a sufficient amount of fiber, especially soluble, to be efficacious continues to be a problem. Those products which are particularly rich in fiber generally employ a fat or oil to increase the palatability of the products to mask partially the dryness and/or grittiness of most fiber sources.

Thus, it is quite surprising that a high soluble fiber, high insoluble fiber, crunchy, organoleptically pleasing efficacious R-T-E cereal can be obtained which does not require high levels of a fat ingredient.

In one method aspect, the present invention provides methods for preparing such novel R-T-E cereal products. In another method aspect, the present invention resides in methods for reducing people's blood serum cholesterol by a regimen of once daily consumption of the present R-T-E cereals.

SUMMARY OF THE INVENTION

The present invention provides cereal compositions and R-T-E cereals fabricated therefrom as well as methods for preparing such R-T-E cereals. The cereal compositions essentially comprise conventional farinaceous cereal ingredients including cereal materials which are rich in soluble and/or insoluble fiber as well as supplemental highly concentrated soluble fiber source materials. The cereal contains at least 3 g/oz to 6 g/oz, i.e., about 10% to 25% soluble fiber. The cereal composition is further defined by the weight ratio of soluble to insoluble fiber and maximum fat. The weight ratio of soluble to insoluble fiber ranges from about 1 to 3:1.

Notwithstanding higher concentrations of water soluble fiber and the absence of added fat, the R-T-E cereals are organoleptically desirable and are easy to manufacture.

In another embodiment, the present invention provides oat or oat bran R-T-E cereals fortified with respect to soluble fiber content by incorporation therein with a barley flour fraction having concentrated levels of barley beta glucan.

In one method aspect, the present invention resides in methods for preparing the present, high soluble fiber containing R-T-E cereal. The methods essentially comprise blending the cereal ingredients with controlled amounts of water, cooking the mixture to form a cooked cereal, forming the cooked cereal into a cooked cereal dough with low shear mixing, and forming the cereal dough into pieces and drying the cereal pieces to form the present R-T-E cereals.

In another method aspect, the present invention resides in methods for reducing the blood serum cholesterol in humans comprising the oral administration in humans of effective amounts of the present R-T-E cereals. Typical dosages range from about 0.5-1.5 g/kg of R-T-E cereal in once to thrice daily dosages to achieve blood serum cholesterol reductions of 5% to 20%.

DETAILED DESCRIPTION OF THE INVENTION

The present invention relates to R-T-E cereals containing high levels of both soluble and insoluble fiber, to methods for their preparation, and to methods of reducing blood serum cholesterol by consumption of such R-T-E cereals. In addition to conventional cereal ingredients, the present cereals additionally comprise highly concentrated sources of soluble fiber and also insoluble fiber sources. Each of these product constituents, as well as their method for preparation and use are described in detail below. Throughout the specification and claims, percentages are by weight and temperatures in degrees Fahrenheit, unless otherwise indicated.

The first essential component of the present cereal compositions is a starchy cereal(s). The cereal component can comprise any conventionally employed starchy cereal or, synonymously, farinaceous material, for use in a ready-to-eat cereal. Exemplary suitable starchy cereals include cereal flours from wheat, rice, corn, oats, barley, rye, or other cereal grains and mixtures thereof. The flours can be whole flours or flour fractions such as with the germ fraction or husk fraction removed. Of course, the R-T-E cereal art is well developed and the skilled artisan will have no difficulty selecting suitable farinaceous materials for use herein.

Desirable starchy cereal component concentrations can range widely and the starchy cereal component can comprise from about 20% to about 80% of the cereal composition. Better results in terms of organoleptic attributes and reductions in R-T-E cereal piece frangibility are obtained when the starchy cereal fraction comprises about 30% to 70% of the composition. For best results the starchy cereal fraction comprises about 40% to 50% of the present cereal compositions.

Especially preferred for use as a farinaceous component in the present cereal compositions is an oat member selected from the group consisting of oat flour, oat bran, oat bran concentrate and mixtures thereof. Oat bran has a fiber fraction in addition to the high cereal or starchy fraction. Preferred compositions include an oat bran member selected from the group consisting of oat bran, oat bran concentrate and mixtures thereof. Oat bran is considered in the art to be concentrated sources of a soluble fiber and can comprise about 4% to 10% soluble fiber (about 1.1-8.5 g/oz) as well as about 6% to 30% insoluble fiber (about 1.7-8.5 g/oz) although the exact amounts will vary due to source, variety, processing, purity, etc. Accordingly, inclusion of oat bran into the present R-T-E cereal composition simultaneously can provide the present essential starchy cereal component, a soluble fiber component, and an insoluble fiber component. The soluble to insoluble fiber ratio of oat bran is approximately 1:1. In preferred embodiments, the oat bran can comprise from about 10% to about 70% of the cereal composition. Better results in terms of organoleptic attributes are obtained when the oat bran comprises from about 12% to about 50% by weight of the composition, and for best results about 40%. Thus, in one embodiment, the present invention provides an oat flour and/or oat bran R-T-E cereal fortified with respect to soluble fiber by inclusion of highly concentrated beta glucan barley flour fraction when oat flour and/or oat bran is the major starchy cereal component.

Of course, utilization of cereal flours as described above will provide R-T-E cereal compositions with some insoluble fiber concentration, particularly when whole grain, e.g., whole wheat, flours are employed. The skilled artisan will further appreciate that minor amounts of soluble fiber are associated with most cereal grains especially with oat flour, oat bran, and barley flour which provides comparatively high levels of soluble fiber. The present cereal compositions comprise higher levels of soluble fiber and insoluble fiber than are associated with whole grains. Generally, it has been found necessary to incorporate into the R-T-E cereal composition supplemental materials which are rich in or concentrated with respect to soluble and/or insoluble fiber. Such addition is desirable in order to achieve the weight ratios of soluble to insoluble fibers surprisingly found to be essential and effective for the realization of high fiber R-T-E organoleptically superior cereals of the present invention.

It has been surprisingly discovered herein that one particularly suitable source of soluble fiber for use herein is a barley flour fraction having concentrated barley beta glucan concentrations. Beta glucans are linear polysaccharides which have $B(1-4)$ and $B(1->3)$ linkages. Beta glucans occur in oats and barley and they are water soluble forming highly viscous solutions. Indeed, oat beta glucans are the principal soluble fiber constituent of oat bran. The content of beta glucans in oats and barley varies, and ranges from 3% to 5%, but in oat bran and specific barley cultivars can reach or exceed 8%. Barley beta glucans contain more $B(1-3)$ linkages while oats contain predominantly $B(1->4)$ linkages. The exact ratio between those linkages varies from one variety or cultivars to another variety (cultivar).

In more preferred embodiments, desirably, the present invention comprises a concentrated source of barley beta glucan, i.e., a barley flour fraction or extract having higher than the native value for the barley variety and generally above 10% beta glucan. Barley flour fractions having beta glucan concentrations as high as 60% are known. One method for isolating beta glucans from barley is disclosed in U.S. Pat. No. 4,804,545 entitled Production of Beta-Glucan, Bran, Protein, Oil and Maltos Syrup from Waxy Barley (issued Feb. 14, 1989 to Goering et al.). See also U.S. Pat. Nos. 4,116,770, entitled Waxy Barley Starch With Unique Self-Liquefying Properties (issued Sept. 26, 1978 to Goering et al.), 4,311,714, entitled Production of Products From Waxy Barley Grain (issued Jan. 19, 1982 to K. J. Goering), 4,428,967, entitled Process For Production of Waxy Barley Products (issued Jan. 31, 1984 to K. J. Goering), each of which is incorporated herein by reference. The '545 patent describes a wet milling process for barley which is capable of yielding a barley fraction or barley flour extract which is highly concentrated with beta glucans. Of course, the higher the beta glucan concentration the more preferred is the particular barley flour extract.

The present R-T-E cereal compositions essentially comprise sufficient amounts of high beta glucan content barley flour alone, or in combination with other soluble fiber providing components, so as to provide the cereal compositions with a soluble fiber content of at least 10% up to about 25%, i.e., at least 2.8 g/oz to up to about 6 g/oz, preferably about 12% to 20%, and for best results about 15% soluble fiber. In the practice of the present invention, good results are obtained when the barley flour extract (comprising itself about 10% to 70% barley beta glucan) comprises about 10% to about 70% of the cereal composition in order to obtain the benefits of good organoleptic properties together with the advantages of dietary fiber. Better results in terms of balancing the health benefits efficacy, especially antihypercholesterolemic activity, balanced with acceptable organoleptic attributes are obtained when the barley flour extract is present at a concentration range of from about 18% to 50% by weight of the cereal, and for best results about 40%. Generally, higher amounts of lower soluble fiber content barley flour extract are needed than when an extract with a higher soluble fiber content is employed.

The present R-T-E cereal compositions can include additional or supplemental concentrated sources of soluble fiber in addition to oat bran and/or high beta glucan barley flour. In less preferred embodiments, the alternate soluble fiber sources can be used in partial substitution for the barley beta glucans, or, in even less preferred embodiments, full substitution. One possible, although expensive, source of soluble fiber is to employ commercially available high methoxyl pectin. While desirable due to its availability and soluble fiber concentration, the utilization of pectin aggravates the problems of providing organoleptically acceptable cereal products. Accordingly, when pectin is used to provide additional soluble fiber, generally lower ratios of soluble to insoluble fiber are preferred. Other useful sources of soluble fiber include locust bean gum, guar gum, carboxymethyl cellulose, gum acacia, xanthan, wheat pentosan, conjac mannon, soy fiber concentrate and mixtures thereof. If present, each of these supplemental soluble fiber sources can comprise from about 0.1% to 10%, and, preferably, when used in addition to oat bran, about 1% to 5% of the present compositions.

It is important that the present cereal compositions have an insoluble fiber component as well as a soluble fiber component. High concentrations of soluble fibers in R-T-E cereal compositions while desirable from a health standpoint can, however, result in undesirable organoleptic attributes including exhibiting upon consumption a slimy or gummy texture unless the cereal compositions have the present soluble to insoluble fiber ratio. While consumers may appreciate the health benefits of the R-T-E cereals with high soluble fiber, unless the organoleptic attributes of the soluble fiber fortified cereal are satisfactory, most consumers will simply refuse the R-T-E cereal product.

Suitable materials for use herein as insoluble fiber sources are well known and the skilled artisan will have no difficulty in selecting materials suitable for use herein. Especially useful herein as sources of insoluble fiber are cereal brans including but not limited to wheat bran, corn bran, rice bran, oat bran, rye bran, barley and mixtures thereof. It will be appreciated that such sources may also contribute minor amounts of soluble fiber as well. Also useful herein are noncereal fiber sources including cellulose flour, cellulose fiber, sugar beet fiber, etc. Sugar beet fiber can comprise up to 80% total dietary fiber with about 20% soluble fiber, including pectin, and 60% insoluble fiber. Sufficient amounts of these materials are used so as to achieve the weight ratio of soluble to insoluble fibers herein.

For good results in terms of cereal dough cooking and processing and especially to obtain organoleptically acceptable R-T-E cereals, the soluble to insoluble fiber ratio ("S/I" ratio) of the present R-T-E cereals essentially ranges from about 0.5 to 3:1. When pectin is employed as a concentrated secondary soluble fiber source, the S/I ratio is essentially about 0.8 to 3:1. Better results are obtained when the S/1 ratio is about 1 to 3:1.

The measurement of total dietary fiber, soluble fiber, and insoluble fiber is subject to disparate analytical methods and values determined thereby. For purposes of the present invention, "soluble" and "insoluble" fiber values are to be determined by an accepted test procedure for fiber developed by Prosky et al. and described in "Determination of Insoluble, Soluble and Total Dietary Fiber in Foods and Food Products," Journal of the Association of Official Analytical Chemists, Vol. 71, No. 5 (1988) which is incorporated herein by reference. The procedure there described involves an enzymatic-gravametric procedure adopted by final action of the AOAC.

If desired, the present R-T-E cereal composition can additionally comprise about 0.1% to about 30% by weight sugar(s) or, synonomously herein, nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained when the sugar(s) component comprises from about 5% to about 15% by weight of the composition. Sucrose can be added to the cereal composition, as a sugar coating, or both.

The present cereal compositions are further essentially defined in part by low fat levels, i.e., the present cereals do not comprise added fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 10%, preferably less than about 8%. Preferably, the R-T-E cereal is substantially free of any externally applied fat or oil.

If desired, the present R-T-E cereal composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% by weight of the cereal composition.

One especially useful material is common salt which functions, in part, as a flavor enhancer. Desirably, the salt comprises about 0.1% to 2%, preferably about 0.5% to 1.0% of the cereal composition.

Still another highly preferred ingredient is a malt syrup flavor ingredient. The malt syrup comprises about 1% to 8% (dry basis), preferably about 2% to 5%.

In certain embodiments the present R-T-E cereals can be vitamin or mineral fortified, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

Method of Preparation

The present invention further resides in cereal preparation processes useful in preparing the present R-T-E cereals. The present invention essentially comprises a first step of forming a dry blend of the cereal components and blending them to form an homogeneous blend. If significant amounts of wet ingredients are to be employed, then this first step may involve the substeps of first preparing separate mixtures of the dry and the wet ingredients and then combining the dry mixture with the wet mixture. The homogeneous blend is then combined with controlled amounts of water and cooked in a conventional manner for cereal dough cooking such as with a batch, atmospheric cooker or a low pressure extruder cooker especially those equipped with a conditioner precooker. The cereal is cooked with steam and sufficient amounts of added water for times and at temperatures sufficient to gelatinize the cereal starch and to develop desired levels of cooked cereal flavor.

The total moisture addition for the present invention is controlled to provide a cooked cereal comprising about 20% to 50% moisture, preferably about 25% to 35% moisture. Moisture addition, if not closely controlled, can result in excessive water absorption by the fiber component. Such excessive water absorption not only can result in processing and handling problems, but also, and more importantly, in adversely affecting the mouthfeel and texture of the present R-T-E cereals.

After cooking, the present methods of R-T-E cereal preparation includes the forming of the cooked cereal into a dough by an extruder and extruded to form cooked cereal dough extrudate ropes. It will be appreciated by the skilled artisan that cereal processing equipment and techniques allow for the combining of the cereal cooking and dough formation steps and such practices are contemplated as useful herein. It is important in the cereal preparation that care be taken to avoid high shear mixing of the components, especially during dough formation. That is, during admixture or cooking, only low shear blending should be employed. Thus, those cereal preparation methods and equipment designed to provide high shear cooking of cereal doughs, are, in preferred embodiments, to be avoided.

Next, the cooked cereal dough is essentially formed into shapes and sizes as desired. For example, the ropes can be cut into pellets ranging in size of from about 40–70/10 g. These pellets are partially dried and can then be flaked to form flakes on the next essential step. The cereal dough pieces are then dried to form the present R-T-E cereals. For example, the flakes can then be toasted to flavor and partially puff the cereal pieces as well as to dry to the described low moisture contents. Optionally, the toasted flakes can be sugar coated and/or topically vitamin fortified. The R-T-E cereal pieces so prepared can then be conventionally packaged for distribution and sale.

The R-T-E cereal pieces so fabricated have relatively low water activities ranging typically from about 0.10 to 0.20 reflecting moisture contents ranging from about 1% to 3%.

The present cereal compositions can be fabricated into any of a variety of common R-T-E cereal forms including, shreds, biscuits, flakes, or any common R-T-E cereal form, shape or size. The present cereal compositions can also be formulated and fabricated so as to provide puffed cereals of various shapes and sizes. Especially desirable for use herein are flakes, especially toasted flakes. Surprisingly, flakes prepared from the present cereal compositions are characterized in part by a softer texture which many individuals find particularly appealing.

If desired, the present cereal compositions can be fabricated into presweetened R-T-E cereals such as by the topical application of a conventional sweetener coating. Both conventional sugar coatings and coatings employing high potency sweeteners can be used to provide a presweetened R-T-E cereal.

The present R-T-E cereal pieces are further essentially defined by high levels of soluble fiber. The present R-T-E cereals essentially comprise at least 10% soluble fiber, or about 2.8 g/oz of soluble fiber. Preferred cereals are essentially further defined by soluble fiber contents ranging from about 3 to 6 g/oz of soluble fiber, i.e., the soluble fiber content is about 11% to 25%. For best results in terms of a balance of eating qualities with the advantages of soluble fiber, the soluble fiber content can range from about 10% to 25%, (i.e., from about 2.8 to 7 g/oz of soluble fiber). In the most preferred embodiment, at least 50% of the soluble fiber is derived from barley beta glucan.

Method of Use

The R-T-E cereals of the present invention can be consumed in a conventional manner, i.e., with milk, to obtain the nutritional and physiological benefits of a high soluble fiber cereal food. In particular, it has been surprisingly discovered that the present cereal compositions when consumed regularly in prescribed dosage amounts can be used for, and thus provide the additional benefit of, antihypercholesterolemia. That is, for persons having elevated levels of blood serum cholesterol, consumption of the present R-T-E cereals effectively lowers their blood serum cholesterol.

Accordingly, the present invention further resides in methods for reducing blood serum cholesterol which essentially comprise the oral administration of about 0.5 to 1.5 g/kg per day of the R-T-E cereal to hypercholesterolemic individuals for extended time periods. Optionally, the dosage can be administered in multiple doses, e.g., thrice daily, which collectively add up to the dosage levels specified. However, a single dosage regimen can also be usefully employed. In individuals exhibiting hypercholesterolemia, e.g., >220 mg/dl, an antihypercholesterolemic effect on the order of a 10% reduction can be expected after six weeks associated with the present cereal consumption method as part of a low fat, low cholesterol diet. That is, some reduction in serum cholesterol levels are associated with the change in diet to a low fat, low cholesterol diet while additional reductions are associated with consumption of the present R-T-E cereal.

Industrial Applicability

The present invention finds particular suitability for use in the R-T-E cereals segment of the packaged foods industry to provide R-T-E cereals of good organoleptic qualities as well as of beneficial levels of high soluble fiber.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of those in the R-T-E cereal art, can be undertaken without departing from the spirit and scope of the invention.

Example 1

A ready-to-eat cereal composition of the present invention having high levels of soluble fiber was prepared according to the following procedure. A dry blend, a wet blend, and a sugar coating composition were separately formed having the respective formulations:

|   | Ingredients | Weight % |
|---|---|---|
| A. | Base Dry Blend | |
|   | Oat bran | 41.50 |
|   | Rice flour | 35.70 |
|   | Barley flour—50% beta glucan | 10.00 |
|   | Sugar beet fiber | 6.30 |
|   | Wheat bran | 2.10 |
|   | Sucrose | 2.42 |
|   | Guar gum | 1.25 |
|   | Sodium bicarbonate | 0.35 |
|   | Trisodium phosphate | 0.30 |
|   | Vitamin blend | 0.08 |
|   |   | 100.00% |
| B. | Malt Syrup/Color Blend | |
|   | Malt syrup | 44.20 |
|   | Corn syrup | 44.10 |
|   | Food grade color | 11.60 |
|   | Potassium sorbate | 0.10 |
|   |   | 100.00% |
| C. | Sugar Slurry | |
|   | Sugar | 60.00 |
|   | Water | 28.20 |
|   | Honey | 6.00 |
|   | Brown sugar syrup | 5.00 |
|   | Salt | 0.80 |
|   |   | 100.00% |

About 2,000 lb (910 kg) of the base dry blend ingredients were blended for 15 minutes in a conventional ribbon blender equipped with a wet blend/dry blend bladed mixer. Sufficient amounts of the Malt/Color blend (about 34 lbs per 2000 lbs base) were added to the blended dry ingredients, and this mixture was further blended for an additional five minutes. The ingredients mixture was then fed to a low pressure single screw cooker extruder equipped with a precooker conditioner with sufficient water to completely cook the mixture to a moisture content of about 35%. The residence time in the conditioner was about 30 min. The conditioner operating pressure was ambient pressure. The cooked cereal base was then extruded as several ropes of dough. The cooked dough ropes were then sheeted with standard cereal dough sheeting equipment. After sheeting, the cooked dough sheet was cut into strips, which in turn was cut again into cereal pieces approximately ½ inch by 3/16 inch to form pellets. The cooked cereal dough pellets were then dried in a conventional pellet dryer to a final moisture range of 22% to 27%, with a target moisture of 25%. The dried cereal pellets were then flaked with standard cereal flaking equipment to a final thickness of 0.018 to 0.022 inch. The wet flakes were then toasted in a cereal toaster at 400 degrees. Both the temperature and the residence time in the toaster can be varied to achieve the desired level of toasted flavor and color. The toasted flakes were then coated with sufficient sugar slurry to produce a final product with approximately 10% added slurry. The coated flakes were then dried to a final moisture of about 2.0%. The high soluble fiber R-T-E cereal so prepared was then conventionally packaged.

The final product had a soluble fiber content of 3.0 g/oz and an insoluble fiber content of 3.0 g/oz giving a soluble to insoluble fiber ratio of 1:1. The beta glucan content is about 6% to 8%. The total fat content was less than 4%. Upon consumption, the R-T-E cereal exhibited a clean flavor and texture profile that is typical of bran flavored cereals but is without a gummy, slimy mouthfeel.

In another embodiment, the R-T-E cereal additionally comprised raisins. In this embodiment, the R-T-E cereal flakes were prepared as described above except that the flakes after toasting and prior to sugar coating were hydrated to a moisture content of about 6%. This moisture adjustment is made so as to prevent moisture migration from the raisins to the cereal flakes which could undesirably result in hardened raisins and less crisp flakes.

EXAMPLE 2

A ready-to-eat cereal composition of the present invention having high levels of soluble fiber is prepared according to the following procedure. A dry blend, a wet blend and a sugar coating composition were separately prepared having the respective formulations:

|   | Ingredients | Weight % |
|---|---|---|
| A. | Dry Base Blend | |
|   | Whole wheat | 66.32 |
|   | Barley flour—18% beta glucan | 15.00 |
|   | White wheat bran | 8.00 |
|   | Sugar | 7.50 |
|   | Salt | 1.50 |
|   | Guar gum | 1.20 |
|   | Vitamin blend | 0.40 |
|   | Trisodium phosphate | 0.08 |
|   |   | 100.00% |
| B. | Malt Syrup Slurry | |
|   | Water | 92.00 |
|   | Cereal malt syrup | 7.90 |
|   | Food coloring (e.g. Annatto) | 0.10 |
|   |   | 100.00% |

| Ingredients | Weight % |
|---|---|
| C. Sugar Slurry | |
| Sugar | 60.00 |
| Water | 28.20 |
| Honey | 6.00 |
| Brown sugar syrup | 5.00 |
| Salt | 0.80 |
| | 100.00% |

About 1,000 kg of dry base ingredients are blended for approximately 15 minutes in a conventional ribbon blender. The dry salt and sugar are weighed out separately and added to the malt syrup slurry mixture. The vitamin blend is also weighed out separately. Sufficient quantities of the malt syrup slurry (about 0.5 kg slurry for each kg of dry base mixture), are prepared in a conventional steam jacketed mixing kettle. The dry base and the prepared slurry are then added to a rotating batch cooker. The base and slurry mixture are then rotated for about 5 minutes to allow adequate mixing. The ingredients are then cooked for 55 minutes at 25 psig steam pressure with processing vents of pressure after 15 minutes and again after 35 minutes elapsed time. Following cooking, the cooked cereal dough is allowed to cool and pelletized in a pelletizing extruder (Ambrette Co.). The vitamin blend is metered into the cooled dough prior to pelleting extrusion at a rate sufficient to result in a final concentration in the cereal of 0.36%. The pellets are then dried in a conventional pellet dryer to a final moisture of 23% to 27%, with a target moisture of 25%. The dried pellets are then tempered for 45 to 60 minutes at ambient temperature in a conventional tempering belt system. The tempered pellets are then flaked using standard cereal flaking equipment to a thickness of about 0.018 to 0.023 inches. The wet flakes are then toasted at 400 degrees in a cereal toaster. The toasted flakes are then coated with sufficient sugar slurry to produce a final product with approximately 10% added slurry.

If desired, additional vitamins may be applied as described in Example 1. Application rates can be easily determined, depending on the final level of fortification required. Alternatively, the flakes may be executed with added raisins as in the previous example.

The final product has a soluble fiber content of 3.3 g/oz and an insoluble fiber content of 3.2 g/oz giving a soluble to insoluble fiber ratio of 1:1. The total fructose concentration of the sugar coated R-T-E cereal is about 5%. The total fat content is less than 2%. The beta glucan content is about 2% to 3%. Upon consumption, the R-T-E cereal will exhibit a pleasing, typical bran cereal flavor and texture profile, without a gummy or slimy mouthfeel.

EXAMPLE 3

An R-T-E cereal of the present invention having high levels of soluble fiber is prepared according to the following procedure. A dry blend, a wet blend and a sugar coating composition were separately prepared having the respective formulations:

| Ingredients | Weight % |
|---|---|
| A. Dry Base Blend | |
| Yellow corn cones | 37.25 |
| Oat bran | 27.00 |
| Barley flour—45% | 24.00 |

| Ingredients | Weight % |
|---|---|
| beta glucan | |
| Sugar | 5.00 |
| Heavy wheat bran | 4.00 |
| Guar gum | 1.20 |
| Salt | 0.50 |
| Sodium bicarbonate | 0.35 |
| Trisodium phosphate | 0.30 |
| Vitamin blend | 0.40 |
| | 100.00% |
| B. Malt Syrup/Color Blend | |
| Malt syrup | 44.20 |
| Corn syrup | 44.10 |
| Food grade color | 11.60 |
| Potassium sorbate | 0.10 |
| | 100.00% |
| C. Sugar Slurry | |
| Sugar | 60.00 |
| Water | 28.20 |
| Honey | 6.00 |
| Brown sugar syrup | 5.00 |
| Salt | 0.80 |
| | 100.00% |

About 1,000 kg of dry base are mixed, blended and processed as described in Example 1 to form R-T-E cereal flakes. The final moisture of the extruded ropes is about 35%. The sugar coating processes are the same as those given in previous examples. The final product has a soluble fiber content of 5.4 g/oz and an insoluble fiber content of 1.8 g/oz giving a soluble to insoluble fiber ratio of 3:1. The total fructose content of the sugar coated flake is less than 5%. The total fat content is less than 4%. The beta glucan content is 11% to 13%.

EXAMPLE 4

An R-T-E cereal of the present invention is prepared according to the following procedure:

| Ingredients | Weight % |
|---|---|
| A. Dry Base Blend | |
| Oat bran | 30.00 |
| Yellow corn cones | 28.00 |
| Barley beta glucan (30% beta glucan) | 16.00 |
| High methoxyl pectin | 13.50 |
| Dent corn starch | 9.60 |
| Guar gum | 1.20 |
| Salt | 0.50 |
| Sodium bicarbonate | 0.50 |
| Vitamin blend | 0.40 |
| Trisodium phosphate | 0.30 |
| | 100.00% |
| B. Corn Syrup Blend | |
| High fructose corn syrup | 99.60 |
| Food coloring | 0.40 |
| | 100.00% |
| C. Aspartame Sweetener | |
| Water | 97.00 |
| Aspartame | 2.70 |
| Xanthan gum | 0.30 |
| | 100.00% |

About 1,000 kg of the dry base mixture are blended in conventional ribbon blender. The corn syrup blend is mixed separately. The cereal base is cooked in a high-temperature, short-time (HTST) single screw extruder cooker equipped with a steam injected conditioner. The extruder is fitted with a die configuration that will produce about 30 to 40 individual ropes of cooked dough, each being approximately 0.12 inches in diameter. Sufficient water is added to the extruder to achieve a moisture of about 15% to 20% in the extruded dough. The corn syrup blend is pumped into the conditioner with a pump suitable for delivery of viscous fluids, and at a rate sufficient to result in a final product with approximately 8% added corn syrup. The color level in the blend may be adjusted as desired. The individual extruded ropes are then cut to desired length with a suitable high-speed cutter. The cut cereal pieces are then toasted at about 400 degrees in a conventional cereal toaster. Following toasting, the cereal pieces are coated with the high-potency artificial sweetener. The aspartame mixture is homogenized, and atomized onto the surface of the cereal at a rate sufficient to produce a final product with about 0.04% added aspartame. An additional vitamin mix may be applied here as described in Example 1. The high soluble fiber R-T-E cereal so prepared was conventionally packaged.

The final product has a soluble fiber content of 6.4 g/oz and an insoluble fiber content of 1.3 g/oz giving a soluble to insoluble fiber ratio of 5:1. The total fructose content of the cereal is about 3% to 4%. The soluble fiber content is about 0.1%. The total fat content is less than 4%.

What is claimed is:

1. A ready-to-eat R-T-E cereal which is high in total dietary fiber, comprising a cereal composition including:
   A. about 20% to 80% by weight of the cereal composition of a starchy cereal ingredient;
   B. about 10% to 70% by weight of the cereal composition of a barley flour extract having glucan content of about 18% to 50% by weight;
   C. sufficient amounts of an insoluble fiber source so as to provide the cereal composition with a weight ratio of soluble fiber to insoluble fiber of about 1 to 5:1;
   D. a moisture content of about 1% to 6% by weight of the cereal composition; and
   wherein the minimum soluble fiber content is about 10% by weight of the cereal composition.

2. The R-T-E cereal of claim 1 wherein the cereal composition additionally comprises:
   E. about 10% to 70% by weight of the cereal composition of an oat member selected from the group consisting of oat flour, oat bran, and oat bran concentrate.

3. The R-T-E cereal of claim 2 wherein the weight ratio of soluble fiber to insoluble fiber is at least 1:1, and wherein the oat member has a soluble fiber content of about 4% to 30% by weight of the oat bran.

4. The R-T-E cereal of claim 3 wherein the cereal composition comprises about 3 to 10 g/oz of soluble fiber.

5. The R-T-E cereal of claim 4 wherein the cereal composition additionally comprises:
   F. about 0.1% to 15% by weight of the cereal composition of a soluble fiber source member selected from the group consisting of guar gum, locust bean gum, carboxymethyl cellulose, high methoxyl pectin, gum acacia, xanthan, conjac mannon, wheat pentosan, soy fiber concentrate, and mixtures thereof.

6. The R-T-E cereal of claim 5 wherein the insoluble fiber source comprises a member selected from the group consisting of sugar beet fiber, wheat bran, corn bran, soy fiber, rice bran, barley bran and mixtures thereof.

7. The R-T-E cereal of claim 6 additionally comprising:
   G. about 1% to 30% by weight of the cereal composition of a nutritive carbohydrate sweetening agent.

8. The R-T-E cereal of claim 7 containing a sugar coating.

9. The R-T-E cereal of claim 8 containing about 3 to 10 g/oz soluble fiber, and
   wherein the R-T-E cereal is in flake form,
   wherein the water activity ranges from about 0.1 to 0.45,
   wherein the weight ratio of soluble fiber to insoluble fiber is greater than 1:1.

10. The R-T-E cereal of claim 9 wherein the cereal is fortified with vitamins and minerals.

11. A method for preparing an R-T-E cereal of good eating quality and high levels of soluble fiber, comprising the steps of:
   A. forming an homogeneous cereal blend comprising
      (1) about 20% to 80% by weight of a starchy cereal ingredient,
      (2) about 10% to 70% by weight of a barley flour extract having a soluble fiber content of about 15% to 50% by weight of beta glucan,
      (3) sufficient amounts of an insoluble fiber source so as to provide the blend with a weight ratio of soluble fiber to insoluble fiber of about 1 to 5:1,
      (4) about 20% to 200% by weight water, the weight percents of ingredients (1) to (3) being based on the total dry weight of the cereal blend,
      wherein the minimum soluble fiber content of the blend is about 3 g/oz (dry weight basis), and
      wherein the total fat content is less than about 10% by weight (dry weight basis);
   B. cooking the blend with steam at a steam pressure of about 2 to 35 psig for about 5 to 30 minutes to form a cooked cereal using low shear agitation;
   C. extruding the cooked cereal with low shear mixing to form a cooked cereal dough extrudate;
   D. forming the cooked cereal dough extrudate into sized shapes and pieces; and
   E. drying the pieces to a water activity of about 0.1 to 0.45 to form R-T-E cereal pieces.

12. The method of claim 11 wherein the cereal blend additionally comprises:
   (5) about 10% to 70% by weight of the blend of oat flour or oat bran.

13. The method of claim 12 wherein the weight ratio of soluble fiber to insoluble fiber is at least 1:1.

14. The method of claim 13 wherein the blend comprises:
   (6) about 0.1% to 15% by weight of the blend of a soluble fiber source member selected from the group consisting of guar gum, carboxymethyl cellulose, high methoxyl pectin, and mixtures thereof.

15. The method of claim 14 wherein the moisture content of the cooked cereal blend ranges from about 15% to 50% by weight,
   wherein in step D, the method includes the substep of forming flaked pieces, and
   wherein in step F, the method includes the substep of toasting the flaked pieces to form toasted, dried flaked R-T-E pieces.

16. The method of claim 15 wherein the method further, includes:

F. providing a sugar coating to the flaked R-T-E pieces.

17. A method for lowering plasma cholesterol levels comprising administering to a human susceptible to or afflicted with hypercholesterolemia an R-T-E cereal composition of claim 1 and wherein the R-T-E cereal is administered to provide about 0.5 to 1.5 g of cereal per kilogram of body weight per day over an extended period of time.

18. A method for lowering plasma cholesterol levels comprising administering to a human susceptible to or afflicted with hypercholesterolemia an R-T-E cereal composition of claim 2 and wherein the R-T-E is administered to provide about 0.5 to 1.5 g of cereal per kilogram of body weight per day over an extended period of time.

19. A method for lowering plasma cholesterol levels comprising administering to a human susceptible to or afflicted with hypercholesterolemia an R-T-E cereal composition of claim 8 and wherein the R-T-E cereal is administered to provide about 0.5 to 1.5 g of cereal per kilogram of body weight per day over an extended period of time.

20. A ready-to-eat cereal of superior eating quality which is high in dietary soluble fiber, comprising a cereal composition including:
   A. about 20% to 80% by weight of the cereal composition of a starchy cereal ingredient;
   B. sufficient amounts of a soluble fiber source to provide about 2.8 g to about 10 g/oz of soluble fiber;
   C. sufficient amounts of an insoluble fiber source so as to provide the cereal composition with a weight ratio of soluble fiber to insoluble fiber of about 1 to 5:1;
   D. a moisture content of about 1% to 6% by weight of the cereal composition; and 21. The R-T-E cereal of claim 20 wherein the soluble fiber source is a member selected from the group consisting of high beta glucan barley flour, guar gum, locust bean gum, carboxymethyl cellulose, high methoxyl pectin, gum acacia, xanthan, conjac mannon, wheat pentosan, soy fiber concentrate, and mixtures thereof.

22. The R-T-E cereal of claim 21 wherein the cereal composition additionally comprises:
   E. about 10% to 70% by weight of the cereal composition of an oat member selected from the group consisting of oat flour, oat bran, oat bran concentrate and mixtures thereof.

23. The R-T-E cereal of claim 22 wherein the weight ratio of soluble fiber to insoluble fiber is at least 1:1, and
   wherein the oat member has a soluble fiber content of about 4% to 30% by weight of the oat bran.

24. The R-T-E cereal of claim 23 wherein the cereal composition comprises about 3 to 6 g/oz of soluble fiber.

25. The R-T-E cereal of claim 24 wherein the insoluble fiber source includes a member selected from the group consisting of sugar beet fiber, wheat bran, corn bran, soy fiber, rice bran, barley bran and mixtures thereof.

26. The R-T-E cereal of claim 25 additionally comprising:
   F. about 1% to 30% by weight of the cereal composition of a nutritive carbohydrate sweetening agent.

27. The R-T-E cereal of claim 26 containing a sugar coating.

28. The R-T-E cereal of claim 27 containing about 3 to 10 g/oz soluble fiber, and
   wherein the R-T-E cereal is in flake form,
   wherein the water activity ranges from about 0.1 to 0.45,
   wherein the weight ratio of soluble fiber to insoluble fiber is greater than 1:1.

29. The R-T-E cereal of claim 28 wherein the R-T-E cereal is fortified with vitamins and minerals.

* * * * *